(12) United States Patent
Nakamura et al.

(10) Patent No.: US 11,243,440 B2
(45) Date of Patent: Feb. 8, 2022

(54) LIGHT CONTROL MEMBER, METHOD FOR PRODUCING LIGHT CONTROL MEMBER, LIGHT CONTROL BODY AND VEHICLE

(71) Applicant: DAI NIPPON PRINTING CO., LTD., Tokyo (JP)

(72) Inventors: Yusuke Nakamura, Tokyo (JP); Satoru Nishima, Tokyo (JP); Norio Ishii, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/471,685

(22) PCT Filed: Dec. 22, 2017

(86) PCT No.: PCT/JP2017/046168
§ 371 (c)(1),
(2) Date: Jun. 20, 2019

(87) PCT Pub. No.: WO2018/117256
PCT Pub. Date: Jun. 28, 2018

(65) Prior Publication Data
US 2020/0004088 A1    Jan. 2, 2020

(30) Foreign Application Priority Data
Dec. 22, 2016    (JP) .............................. JP2016-249959

(51) Int. Cl.
*G02F 1/1337*    (2006.01)
*G02F 1/1339*    (2006.01)

(52) U.S. Cl.
CPC .... *G02F 1/133723* (2013.01); *G02F 1/13392* (2013.01)

(58) Field of Classification Search
CPC ......... G02F 1/0107; G02F 2001/13396; G02F 1/1339; G02F 1/13392; G02F 1/1337; G02F 1/133723; G02F 1/13396
See application file for complete search history.

(56) References Cited

U.S. PATENT DOCUMENTS

2006/0017870 A1* 1/2006 Nagata ................ G02F 1/13392
349/114
2007/0146618 A1 6/2007 Hashimoto
(Continued)

FOREIGN PATENT DOCUMENTS

CN    101802696 A    8/2010
CN    103149721 A    6/2013
(Continued)

OTHER PUBLICATIONS

Mar. 13, 2018 International Search Report issued in International Patent Application No. PCT/JP2017/046168.
(Continued)

*Primary Examiner* — Michael H Caley
*Assistant Examiner* — Mariam Qureshi
(74) *Attorney, Agent, or Firm* — Oliff PLC (57) ABSTRACT

A light control member exhibits strong adhesion between an alignment layer and a bead spacer and includes: a first and second laminate with a substrate and an alignment layer, and which is arranged so that the alignment layer thereof faces the alignment layer of the first laminate; a liquid crystal layer between the first laminate and the second laminate, and the alignment is controlled by driving electrodes on at least one of the first laminate and the second laminate; and a plurality of bead spacers which are arranged within the liquid crystal layer. This light control member is also characterized in that: at least one of the alignment layer of the first laminate and the alignment layer of the second laminate has a plurality of (Continued)

projections that protrude toward the liquid crystal layer; and at least some of the bead spacers are held by the projections.

14 Claims, 4 Drawing Sheets

(56) References Cited

U.S. PATENT DOCUMENTS

| | | | | |
|---|---|---|---|---|
| 2008/0204645 A1* | 8/2008 | Kawabe | ............... | G02F 1/13394 349/123 |
| 2009/0086152 A1* | 4/2009 | Seo | ............... | G02F 1/13394 349/155 |
| 2010/0195035 A1* | 8/2010 | Hirato | ............... | G02F 1/13394 349/124 |
| 2013/0135543 A1 | 5/2013 | Kaifu et al. | | |
| 2017/0329161 A1* | 11/2017 | Baker | ............... | G02F 1/133377 |
| 2020/0004064 A1* | 1/2020 | Miller, IV | ......... | G02F 1/133305 |

FOREIGN PATENT DOCUMENTS

| | | |
|---|---|---|
| EP | 2808729 A1 | 12/2014 |
| JP | S63-036224 A | 2/1988 |
| JP | H01-164924 A | 6/1989 |
| JP | H03-47392 A | 2/1991 |
| JP | H05-333349 A | 12/1993 |
| JP | H06-175139 A | 6/1994 |
| JP | H06-230396 A | 8/1994 |
| JP | H08-184273 A | 7/1996 |
| JP | 2000-235188 A | 8/2000 |
| JP | 2000-284249 A | 10/2000 |
| JP | 2001-109000 A | 4/2001 |
| JP | 2007-515661 A | 6/2007 |
| JP | 2008-233788 A | 10/2008 |
| JP | 2008-256993 A | 10/2008 |
| WO | 2005/031437 A1 | 4/2005 |

OTHER PUBLICATIONS

Martin Schadt et al. "Surface-Induced Parallel Alignment of Liquid Crystals by Linearly Polymerized Photopolymers". Japanese Journal of Applied Physics, 1992, vol. 31, pt. 1, No. 7, pp. 2155-2164.
Martin Schadt et al. "Optical Patterning of Multi-Domain Liquid-Crystal Displays With Wide Viewing Angles". Letters to Nature, May 16, 1996, vol. 381, pp. 212-215.
May 12, 2020 extended European Search Report issued in European Patent Application No. 17883186.3.
Oct. 26, 2021 Office Action issued in Japanese Patent Application No. 2018-558088.
Sep. 2, 2021 Office Action issued in Chinese Patent Application No. 201780076882.1.

* cited by examiner

LIGHT CONTROL MEMBER, METHOD FOR PRODUCING LIGHT CONTROL MEMBER, LIGHT CONTROL BODY AND VEHICLE

TECHNICAL FIELD

The invention relates to a light control member, a method for producing a light control member, a light control body, and a vehicle.

BACKGROUND ART

Conventionally, for example, there have been proposed various light control members controlling transmission of external light while being attached to a window (Patent Documents 1 and 2). As one of such light control members, one using liquid crystal is known. The light control member that uses liquid crystal sandwiches the liquid crystal by two transparent substrates forming transparent electrodes and applies a voltage across the transparent electrodes so that the alignment of the liquid crystal molecules is changed and the transmittance of external light is controlled. In such a light control member, a spacer is provided between the transparent substrates and a liquid crystal layer is held in a desired thickness by the spacer.

Here, there is a case where a bead spacer is used as the spacer. Generally, in the bead spacer, beads are sprayed to the surface of the transparent substrate provided with an alignment layer, a sealing material is further formed on the periphery thereof to be bonded thereto, and liquid crystal is injected in a vacuum state.

Patent Document 1: Japanese Unexamined Patent Application, Publication No. H03-47392
Patent Document 2: Japanese Unexamined Patent Application, Publication No. H08-184273

DISCLOSURE OF THE INVENTION

Problems to be Solved by the Invention

Here, in a case where the transparent substrate is a glass substrate, the bead spacer cannot easily move since the liquid crystal is injected in a state in which the bead spacer is sandwiched between the transparent substrates. However, in the case of the method of dropping the liquid crystal before bonding the transparent substrate, when the adhesive force of the bead spacer with respect to the substrate is weak, the liquid crystal flows so that the bead spacer moves. When the bead spacer moves, there is a possibility that unevenness occurs in the thickness of the liquid crystal so that rainbow unevenness and the like occur.

Further, when the light control member is used in an environment of a vehicle or the like that receives a vibration at all times differently from a television or the like, the bead spacer can more easily move. Particularly, when the transparent substrate has a film shape, a pressing force between the transparent substrates becomes weak in a place where the transparent substrate is slackened so that the bead spacer can easily move. When the light control member is attached to a curved surface, such movement tends to be stronger.

A method of improving an adhesive force by providing an adhesion layer on the bead spacer is also used. However, if the adhesion layer is thick, the adhesion layer is crushed when the transparent substrate is bonded and the thickness of the liquid crystal layer becomes sparse. Accordingly, unevenness is likely to occur particularly in a Vertical Alignment (VA) type or the like which is sensitive to the thickness of the liquid crystal layer.

An object of the invention is to provide a light control member having strong adhesion between an alignment layer and a bead spacer, a method for producing a light control member, a light control body, and a vehicle.

Means for Solving the Problems (1) A light control member including: a first laminate which includes a substrate and an alignment layer; a second laminate which includes a substrate and an alignment layer and is disposed with respect to the first laminate so that their alignment layers face each other; a liquid crystal layer which is disposed between the first laminate and the second laminate and of which alignment is controlled by the driving of an electrode provided in at least one of the first laminate and the second laminate; and a plurality of bead spacers which are disposed in the liquid crystal layer, in which at least one alignment layer of the alignment layer of the first laminate and the alignment layer of the second laminate is provided with a plurality of projections which protrude toward the liquid crystal layer, and in which at least a part of the bead spacers is held by the projection.

(2) The light control member according to (1), in which the alignment layer includes a covering portion which covers a surface of a bead spacer held by the projection.

(3) The light control member according to (1) or (2), in which the substrates of the first laminate and the second laminate are resin films, and in which the liquid crystal layer includes a dichroic dye.

(4) The light control member according to any one of (1) to (3), in which an agglomeration ratio of the bead spacers agglomerated in two or more and four or less among the plurality of bead spacers disposed in the liquid crystal layer is 20% or more.

(5) The light control member according to any one of (1) to (4), in which a hard coat layer is provided on the liquid crystal layer side surface of at least one substrate of the substrates provided with the first laminate and the second laminate.

(6) The light control member according to any one of (1) to (5), in which the bead spacer has a spherical shape, and in which a relation of 0.8≤r/R is established when a diameter of the bead spacer is indicated by R and a maximum diameter of a portion held inside the projection in the bead spacer is indicated by r.

(7) The light control member according to any one of (1) to (6), in which the inside of the projection is filled with a material of the alignment layer or a resin component caused by the bead spacer.

(8) A method for producing a light control member including: a first laminate producing step of forming an alignment layer on a first substrate to form a first laminate; a second laminate producing step of forming an alignment layer on a second substrate to form a second laminate; a seal portion forming step of forming a seal portion on an outer peripheral portion of the second laminate; a liquid crystal inflow step of flowing liquid crystal into the seal portion; and a laminating step of laminating the first laminate and the second laminate, in which a bead spacer is included in at least one of a material forming the alignment layer of the first substrate and a material forming the alignment layer of the second substrate.

(9) The method for producing the light control member according to (8), in which a bead spacer is included in both of materials forming the alignment layer of the first substrate and the alignment layer of the second substrate.

(10) The method for producing the light control member according to (8) or (9), in which in the first laminate producing step and the second laminate producing step, a laminate producing step of forming an alignment layer by a material including the bead spacer includes a step of forming the alignment layer two times.

(11) A light control body including: a transparent member; and the light control member according to any one of (1) to (7) disposed on the transparent member.

(12) A vehicle in which the light control member according to any one of (1) to (7) is disposed on a portion to which external light is incident.

Effects of the Invention

According to the invention, it is possible to provide a light control member having strong adhesion between an alignment layer and a bead spacer and a method for producing a light control member.

PREFERRED MODE FOR CARRYING OUT THE INVENTION

First Embodiment (Light Control Film)

Figure 1:
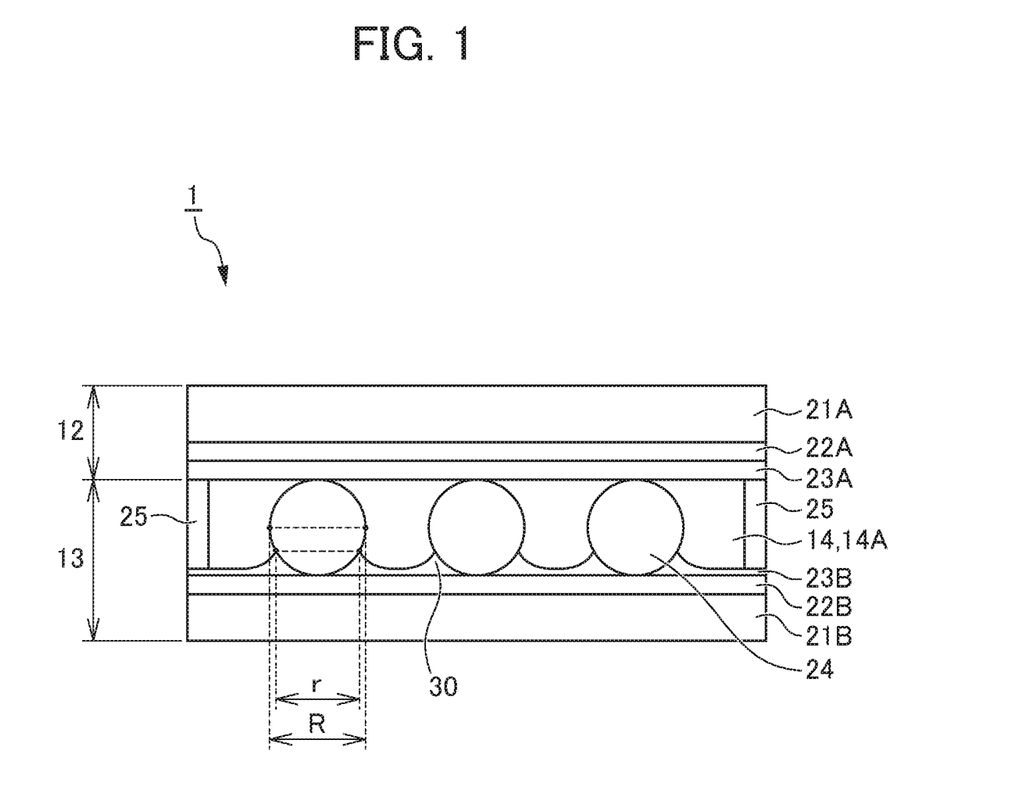
FIG. 1 is a cross-sectional view illustrating a light control film 1 which is an embodiment of a light control member.

FIG. 1 is a cross-sectional view of a light control film 1 which is an embodiment of a light control member of the invention. The light control film 1 of the embodiment is formed in a flexible film shape as a kind of light control member. The light control film 1 is attached to, for example, a portion having a curved surface such as a sunroof of a vehicle so as to switch transmission and opacity. The light control film 1 is disposed on a transparent member such as a sunroof as described above and is mainly used as a light control body. More specifically, the light control film 1 can be used as a light control body which is attached to a transparent member such as a transparent resin plate or glass by adhesive or the like or is sandwiched between glass plates (transparent members) to become reinforced glass. This light control film 1 (the light control member) can control the amount of the light which is incident into a building or a vehicle while being disposed on, for example, a light control part (a part to which external light is incident, for example, front, side, rear, and roof windows) such as a window glass of a building, a showcase, an indoor transparent partition, a window of a vehicle, and the like.

The light control film 1 is the light control film 1 which controls the transmitted light by using a liquid crystal 14A and has a configuration in which a liquid crystal layer 14 is sandwiched by a first laminate 12 and a second laminate 13. A spacer 24 which maintains a uniform thickness of the liquid crystal layer 14 is provided between the first laminate 12 and the second laminate 13. The first laminate 12 and the second laminate 13 are formed by sequentially forming a first transparent electrode 22A, a second transparent electrode 22B, a first alignment layer 23A, and a second alignment layer 23B on a first substrate 21A and a second substrate 21B. Furthermore, in the case of an IPS type to be described later, the first transparent electrode 22A and the second transparent electrode 22B are collectively produced on one of the first alignment layer 23A and 23B. Then, the light control film 1 controls the transmission of external light by changing a potential difference between the first transparent electrode 22A and the second transparent electrode 22B.

(Substrate)

In the first substrate 21A and the second substrate 21B, various laminates having flexibility and light transmissivity applicable to the light control film 1, such as triacetyl cellulose (TAC), polycarbonate film, cycloolefin polymer (COP), acrylic, and polyethylene terephthalate (PET) can be applied and in the embodiment, a film material which is formed of polycarbonate and in which hard coat layers are produced on both sides is applied.

(Transparent Electrode)

The first transparent electrode 22A and the second transparent electrode 22B are respectively formed of transparent conductive films laminated on the first substrate 21A and the second substrate 21B. As a transparent conductive film, various transparent electrode materials applicable to this kind of transparent resin film can be applied and a transparent metal thin film having an oxide-based total light transmittance of 50% or more can be exemplified. For example, tin oxide type, indium oxide type, and zinc oxide type can be exemplified.

Examples of tin oxide ($SnO_2$) include nesa (tin oxide $SnO_2$), Antimony Tin Oxide (ATO: antimony-doped tin oxide), and fluorine-doped tin oxide. Examples of indium oxide ($In_2O_3$) include indium oxide, Indium Tin Oxide (ITO), and Indium Zinc Oxide (IZO). Examples of zinc oxide (ZnO) include zinc oxide, aluminum-doped zinc oxide (AZO), and gallium-doped zinc oxide. In the embodiment, the transparent conductive film is formed by Indium Tin Oxide (ITO).

Here, a hard coat layer (not illustrated) may be provided on a surface provided with at least the liquid crystal layer 14 of the substrates 21A and 21B (between the first substrate 21A and the first transparent electrode 22A and between the second substrate 21B and the second transparent electrode 22B). Since each substrate is provided with the hard coat layer, it is possible to prevent the bead spacer 24 sandwiched between the substrates from being bitten into the substrates when an external force or the like is applied to the surface of the light control film 1. Accordingly, it is possible to prevent the dent and crack of the substrate and to improve the pressure resistance of the light control film 1. The hard coat layer is formed of an acrylic resin, a urethane resin, a silicon resin, or the like and may have various functions such as antistatic, ultraviolet ray absorption, and heat ray absorption if necessary. Furthermore, the hard coat layer may be provided on at least one of the first substrate 21A and the second substrate 21B or may be provided on not only a surface on the side of the liquid crystal layer 14 of the substrate but also the opposite surface thereof. Further, an index matching layer for adjusting a refractive index may be further provided between the hard coat layer and the transparent electrode 22 and the hard coat layer may have a function of adjusting a refractive index so that the hard coat layer serves as an index matching layer.

(Alignment Layer)

The first alignment layer 23A and the second alignment layer 23B are formed by the light alignment layer. As a light alignment material applicable to the light alignment layer, various materials capable of applying a light alignment method can be applied, but in the embodiment, for example, a light dimerization type material is used. The light dimerization type material is disclosed in "M. Schadt, K. Schmitt, V. Kozinkov and V. Chigrinov: Jpn. J. Appl. Phys., 31, 2155 (1992)", "M. Schadt, H. Seiberle and A. Schuster: Nature, 381, 212 (1996)" and the like.

Further, the first alignment layer 23A and the second alignment layer 23B may be produced by a rubbing treatment instead of the light alignment layer. In this case, the first alignment layer 23A and the second alignment layer 23B are formed by producing various material layers applicable to the alignment layer such as polyimide and forming a fine line-shaped unevenness shape on the surface of the material layer by a rubbing treatment using a rubbing roll. Instead of the alignment or light alignment by the rubbing treatment, the alignment layer may be produced by producing the fine line-shaped unevenness shape produced by the rubbing treatment in the shaping process. Furthermore, in the first alignment layer 23A and the second alignment layer 23B which are formed of various materials applicable to the alignment layer such as polyimide, the line-shaped unevenness shape may be omitted.

(Spacer)

In the embodiment, the spherical bead spacer 24 is used as the spacer. The bead spacer 24 is provided to define the thickness of the liquid crystal layer 14. In the bead spacer 24, a structure formed by an inorganic material using a silica or the like, a structure formed by an organic material, a core-shell structure formed by a combination thereof, and the like are widely applicable. Further, in addition to the configuration of the spherical shape, a rod shape of a cylindrical shape, a prismatic shape, or the like may be used. Furthermore, the liquid crystal layer 14 may further include a spacer, for example, a spacer formed by photolithography or printing other than the bead spacer in addition to the bead spacer 24.

(Liquid Crystal Layer)

In the liquid crystal layer 14, various liquid crystals 14A applicable to this kind of light control film 1 can be widely used. Furthermore, in the embodiment, the liquid crystal layer 14 uses the guest-host type liquid crystal 14A mixed with a dichroic dye. It is possible to control light transmission and light shielding by moving the dichroic dye as the liquid crystal molecules move. A twisted Nematic liquid crystal (TN liquid crystal) 14a is used as the liquid crystal 14A. When the TN liquid crystal is used as a host and the dichroic dye is used as a guest, the light control film is of a so-called normally black type in which a screen becomes black since liquid crystal molecules and a dichroic dye are aligned horizontally to shield light when no voltage is applied. When a voltage is gradually applied, the liquid crystal molecules vertically rise and the dichroic dye also rises so that light is transmitted. Furthermore, in the liquid crystal 14A, a VA type liquid crystal may be used in addition to the above-described TN type liquid crystal. In the case of the guest-host VA type, the light control film is a so-called normally white type in which the liquid crystal molecules and the dichroic dye rise vertically so that light is transmitted when no voltage is applied.

However, the invention is not limited thereto. As the liquid crystal 14A and the dye used as the guest-host type, a mixture of the liquid crystal 14A and the dye proposed in the guest-host type can be widely applied.

Further, the invention is not limited to the guest-host type and the liquid crystal layer formed of a liquid crystal material not including a dichroic dye may be used. In this case, not only the TN type but also the Vertical Alignment (VA) type may be used to drive the liquid crystal layer 14. The VA type is a type in which the transmitted light is controlled by changing the alignment of the liquid crystal 14A in the vertical direction and the horizontal direction. When the liquid crystal 14A is aligned vertically in a non-electric field, the liquid crystal layer 14 is sandwiched by the vertical alignment layers to form the light control film 1. Then, the liquid crystal 14A is aligned horizontally by the application of an electric field. In the case of the VA type, the light control film is of a so-called normally black type in which a screen normally becomes "black" when no voltage is applied.

Further, an In-Plane-Switching (IPS) type may be used. The IPS type is a drive type of collectively forming a drive transparent electrode on one substrate of a pair of substrates sandwiching the liquid crystal layer 14, forming a so-called horizontal electric field corresponding to an in-plane electric field on the surface of the substrate by the transparent electrode, and controlling the alignment of the liquid crystal 14A.

A sealing material 25 is formed in a frame shape so as to surround the liquid crystal layer 14. The sealing material 25 adheres to the first laminate 12 and the second laminate 13 and the leakage of the liquid crystal 14A is prevented by the sealing material 25.

(Production Step)

Figure 2:
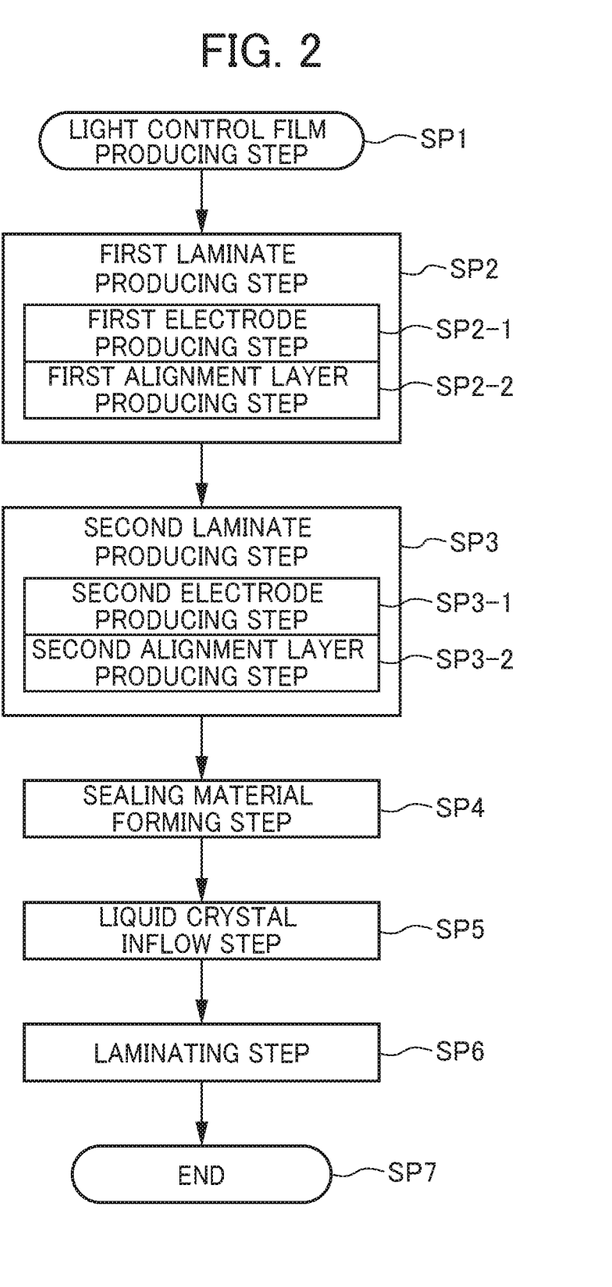
FIG. 2 is a flowchart illustrating a step of producing the light control film 1.

FIG. 2 is a flowchart illustrating a step of producing the light control film 1. First, in a first laminate producing step SP2, the first laminate 12 is produced. The first laminate producing step SP2 includes a first electrode producing step SP2-1 and a first alignment layer producing step SP2-2. In the first electrode producing step SP2-1, the first transparent electrode 22A is produced on the first substrate 21A by ITO according to a vacuum deposition method such as sputtering.

In the first alignment layer producing step SP2-2, a coating solution for the first alignment layer 23A is applied by a gravure coater. Then, the solvent of the coating solution is volatilized and dried in a drying oven, so that the first alignment layer 23A is produced.

In a subsequent second laminate producing step SP3, the second laminate 13 is produced. The second laminate producing step SP3 includes a second electrode producing step SP3-1 and a second alignment layer producing step SP3-2. In the second electrode producing step SP2-1, the second transparent electrode 22B is produced on the second substrate 21B by ITO according to a vacuum deposition method such as sputtering.

In the second alignment layer producing step SP3-2, a coating solution for the second alignment layer 23B is applied by a gravure coater. In the coating solution, the bead spacers 24 are mixed so as to be 150 pieces per 1 $mm^2$. Next, the solvent of the coating solution is volatilized and dried in a drying oven, so that the second alignment layer 23B is produced. A ratio of an area (a projection area) occupied by the bead spacers 24 inside the liquid crystal layer 14 is preferably 0.1% or more and 2.5% or less in an area of a surface perpendicular to the thickness direction of the liquid crystal layer. It is not preferable in that the pressure resistance of the liquid crystal layer 14 to be described later decreases when the ratio is smaller than 0.1%. Further, it is not preferable in that the transmittance in the transmission state of the light control film 1 decreases when the ratio exceeds 2.5%.

In a sealing material coating step SP4 subsequent to the second laminate producing step SP3, the sealing material 25 is applied to the second laminate 13 in a frame shape by using a dispenser. In the embodiment, the sealing material 25 is a UV (ultraviolet) thermosetting resin.

Next, in a liquid crystal inflow step SP5, the liquid crystal 14A flows into this frame shape by a drop injection method. Then, in a laminating step SP6, the first laminate 12 and the second laminate 13 are laminated and pressed so that the liquid crystal 14A disposed on the second laminate 13 spreads inside the sealing material 25 formed in a frame shape. Then, the sealing material 25 is cured by the irradiation of ultraviolet rays or the like, so that the light control film 1 is produced. Furthermore, in the arrangement of the liquid crystal 14A, instead of the drop injection method, various methods can be applied when the first laminate 12 and the second laminate 13 are laminated and the liquid crystal material is disposed in a gap formed in a portion involving with the liquid crystal layer or the like.

Here, as described above, the coating solution involving with the second alignment layer 23B is applied onto the second transparent electrode 22B of the second substrate 21B while the bead spacers 24 are mixed in the second alignment layer producing step SP3-2. Then, the solvent of the coating solution is volatilized and dried in a drying furnace. Then, the water level (liquid level) of the coating solution drops. At this time, the water level (liquid level) of the coating solution contacting the bead spacer 24 does not decrease in other portions. Thus, the periphery of the bead spacer 24 is solidified so that the second alignment layer 23B partially protrudes toward the liquid crystal layer 14 and a projection 30 is integrally formed with the second alignment layer 23B so as to cover the outer peripheral curved surface (the surface) at the lower side (the side of the second substrate 21B) of the bead spacer 24. Then, as illustrated in FIG. 1, the bead spacers 24 are held on the second alignment layer 23B by the projection 30. Accordingly, in the light control film 101, the bead spacers 24 can be more strongly disposed on the second alignment layer 23B as compared with a conventional case where the bead spacers having the adhesion layers are sprayed to be disposed on the alignment layer, thereby extremely suppressing the movement of the bead spacers in the liquid crystal inflow step or the like.

Here, conventionally, the bead spacers have adhesion layers (adhesive layers) formed on the surfaces thereof and are dispersed on the substantially flat alignment layer by spraying or the like. In this case, since the bead spacers are fixed to the alignment layer in a dot-contact state, a gap is formed between the alignment layer and the lower outer peripheral curved surface of the bead spacer. For this reason, in the liquid crystal inflow step (SP5), when the guest-host type liquid crystal including the dichroic dye is dropped onto the alignment layer, the liquid crystal cannot sufficiently reach the above-described gap and air remains in that gap since the guest-host type liquid crystal including the dichroic dye has high viscosity as compared with the liquid crystal not including the dichroic dye. Since the air which remains in the gap in this way is heated in the laminating step (SP6) or is subjected to a change in temperature at the time of using the light control film later, bubbles are generated inside the liquid crystal layer, so that the quality of the light control film is degraded. Further, when a resin film (a substrate) is stretched due to heating or the like particularly in a case where a resin film is used as the substrate instead of a glass plate, the air remaining in the above-described gap is easily accumulated in the liquid crystal layer. As a result, there is a high possibility that the air is seen as bubbles.

Therefore, in the light control film 1 of the embodiment, since the bead spacers are held by the projection 30 provided in the second alignment layer 23B, the above-described gap is filled with the alignment layer material (the coating solution) as illustrated in FIG. 1. Accordingly, since it is possible to extremely reduce the amount of air remaining in the liquid crystal layer due to the gap, it is possible to largely suppress bubbles from being generated in the liquid crystal layer due to the heating in the laminating step SP6 or a change in temperature at the time of using the light control film later.

In the light control film 1 of the embodiment, the lower limit of the agglomeration ratio of the bead spacers agglomerated in two or more and four or less in the bead spacers disposed in the liquid crystal layer 14 is preferably 20% or more, more preferably 30% or more, and further preferably 40% or more. Since the agglomeration ratio of the bead spacers agglomerated in two or more and four or less satisfies the above-described range, the pressure resistance of the liquid crystal layer 14 can be improved. That is, it is possible to largely suppress a change or breakage of a gap due to the crushing of the liquid crystal layer by the use of the agglomerated bead spacers when an external force is applied to the light control film 1 (the liquid crystal layer 14). Particularly when the light control film is sandwiched by glass substrates to become a reinforced glass, it is possible to extremely suppress the deformation of the light control film (the liquid crystal layer) even when a large pressure is applied to the light control film and hence to prevent a non-uniform thickness of the liquid crystal layer. If the agglomeration ratio of the bead spacers agglomerated in two or more and four or less in the liquid crystal layer 14 is smaller than 20%, the ratio of the agglomerated bead spacers decreases too much, which is not preferable in that the liquid crystal layer may be crushed or damaged.

The agglomeration ratio of the bead spacers indicates a ratio ($100 \times S2/S1$ [%]) of the number $S2$ of the agglomerated bead spacers with respect to the number $S1$ of the total bead spacers disposed within a predetermined region inside the liquid crystal layer. For example, the agglomeration ratio of the bead spacers agglomerated in two or more and four or less indicates a ratio of the number of the agglomerated bead spacers agglomerated in two or more and four or less with respect to the number $S1$ of the total bead spacers disposed within a predetermined region of the liquid crystal layer. Here, the agglomerated bead spacers indicate the agglomeration of the bead spacers. Further, when the agglomerated bead spacers are included, the number $S1$ of the total bead spacers does not indicate the number of the bead spacers constituting the agglomeration, but indicates the number of the agglomerations. For example, when there are two non-agglomerated bead spacers and one agglomeration of three bead spacers within a predetermined region inside the liquid crystal layer, the number $S1$ of the total bead spacers within this predetermined region becomes the sum of the number (two) of the non-agglomerated bead spacers and the number (one) of the agglomerations, that is, three.

Further, the upper limit of the agglomeration ratio of the bead spacers agglomerated in two or more and four or less in the bead spacers disposed on the liquid crystal layer 14 is preferably 80% or less, more preferably 70% or less, and further preferably 60% or less. Since the agglomeration ratio of the bead spacers agglomerated in two or more and four or less satisfies the above-described range, it is possible to uniformly disperse the bead spacers in the liquid crystal layer and to suppress a non-uniform thickness of the liquid crystal layer. When the agglomeration ratio exceeds 80%, this is not preferable in that the distribution of the bead spacers in the liquid crystal layer becomes non-uniform. Further, when the agglomeration ratio is larger than 80%, the agglomerated bead spacers blocks the light transmitted through the light control film 1 (the liquid crystal layer 14) more than necessary, which is not preferable in that the transmission amount of the light of the light control film 1 in the transmission state decreases.

Further, the upper limit of the agglomeration ratio of the bead spacers agglomerated in five or more in the bead spacers disposed on the liquid crystal layer 14 is preferably smaller than 15%, more preferably smaller than 10%, and further preferably smaller than 6%. Since the agglomeration ratio of the bead spacers agglomerated in five or more satisfies the above-described range, it is possible to uniformly disperse the bead spacers in the liquid crystal layer and to suppress a non-uniform thickness of the liquid crystal layer.

As described above, in the light control film 1 of the embodiment, the bead spacer 24 is disposed and the alignment layer is produced by coating the alignment layer material mixed with the bead spacer 24 in the second alignment layer producing step SP3-2. In this case, since the bead spacer 24 tends to easily agglomerate in the alignment layer drying process, it is possible to appropriately adjust the agglomeration ratio of the bead spacers agglomerated in two or more and four or less by adjusting the drying condition (the drying temperature or the drying time) of the alignment layer.

Here, the detail of the agglomeration ratio of the light control film which satisfies the range of the agglomeration ratio and is produced by two kinds of bead spacers having different diameters is shown in Table 1. In Table 1, the agglomeration ratio is calculated on the basis of an average value obtained by counting the number of the bead spacers within a rectangular region (1.5 mm×1.5 mm) at five positions (a center and middle points of four corners) within the surface of the light control film 1 (the liquid crystal layer 14).

TABLE 1

| | | Aggregation ratio of bead spacers[%] | | |
|---|---|---|---|---|
| | Bead diameter [μm] | Two or more | Two or more and four or less | Five or more |
| Example1-1 | 6.2 | 47.1 | 43.9 | 3.2 |
| Example1-2 | 9.0 | 60.4 | 55.2 | 5.2 |
| Comparative Example1 | 5.7 | 21.4 | 16.4 | 5.0 |

Example 1-1 of Table 1 indicates the agglomeration ratio of the light control film that uses the bead spacer having a diameter of 6.2 μm. In the light control film, since the alignment layer drying condition was adjusted as described above, the agglomeration ratio of the bead spacers agglomerated in two or more became 47.1%. Among these, the agglomeration ratio of the bead spacers agglomerated in two or more and four or less became 43.9% and the agglomeration ratio of the bead spacers agglomerated in five or more became 3.2%. Accordingly, it was observed that both of the pressure resistance of the light control film with respect to the external force and the transmitted light amount thereof in a transmission state were enough as a product. Further, Example 1-2 of Table 1 indicates the agglomeration ratio of the light control film that uses the bead spacer having a diameter of 9.0 μm. Also in the light control film, since the alignment layer drying condition was adjusted as described above, the agglomeration ratio of the bead spacers agglomerated in two or more became 60.4%. Among these, the agglomeration ratio of the bead spacers agglomerated in two or more and four or less became 55.2% and the agglomeration ratio of the bead spacers agglomerated in five or more became 5.2%. Accordingly, it was observed that both of the pressure resistance of the light control film with respect to the external force and the transmitted light amount thereof in a transmission state were enough as a product.

Comparative Example 1 of Table 1 indicates the agglomeration ratio of the light control film that uses the bead spacer having a diameter of 5.7 μm. In the light control film, the agglomeration ratio of the bead spacers agglomerated in two or more became 21.4%. Among these, the agglomeration ratio of the bead spacers agglomerated in two or more and four or less became 16.4% and the agglomeration ratio of the bead spacers agglomerated in five or more became 5.0%. In the light control film of Comparative Example 1, it was observed that the pressure resistance of the light control film with respect to an external force was not enough as compared with the light control films of Example 1-1 and Example 1-2. This was because the agglomeration ratio (16.4%) of the light control film of the bead spacers agglomerated in two or more and four or less of Comparative Example 1 was lower than the agglomeration ratios of Example 1-1 and Example 1-2.

Hereinafter, an effect of the light control film 1 of the embodiment in which the bead spacer 24 is held by the projection 30 of the second alignment layer 23B in this way will be described by the comparison with comparative examples.

COMPARATIVE EXAMPLE 2

First, Comparative Example 2 will be described. In Comparative Example 2, the coating solution used in the second alignment layer producing step does not include the bead spacer. In Comparative Example 2, a sample was prepared by spraying a commercial bead spacer having an adhesion layer onto a second alignment layer, melting the adhesion layer through a heating treatment, and adhering the bead spacer to the second alignment layer through a cooling treatment. Next, air was blown from an air gun (air blow) to a second substrate (to be laminated with a first substrate) and the bead spacer remaining ratio was obtained. The nozzle of the air gun is 2 mmϕ, the distance between the air gun and the second substrate is 5 mm, and the blowing time is 15 sec. A large decrease in bead spacer remaining ratio was observed when the pressure of the air blow was gradually increased from 1 kgf/cm$^2$ by 1 kgf/cm$^2$ so as to exceed 5 kgf/cm$^2$. The bead spacer remaining ratio at 5 kgf/cm$^2$ was 30%.

Example 2 of Embodiment

Air was blown from an air gun (an air blow) to the second substrate 21B (to be laminated with the first substrate) to the second alignment layer 23B produced in the above-described second laminate producing step SP3 and the remaining ratio of the bead spacer 24 was obtained. The nozzle of the air gun was 2 mmϕ, the distance between the air gun and the second substrate was 5 mm, and the blowing time was 15 sec. A large decrease in remaining ratio of the bead spacer 24 was observed when the pressure of the air blow was gradually increased from 1 kgf/cm² by 1 kgf/cm² so as to exceed 5 kgf/cm². When a maximum diameter of a portion held inside the projection 30 in the bead spacer 24 is indicated by r (see FIG. 1) and a ratio of r with respect to R is indicated by r/R, a satisfactory result was obtained as compared with Comparative Example 2 also at r/R=0.6 since the remaining ratio was 100% at r/R=1.

As described above, when the bead spacer 24 was mixed with the alignment layer as in the embodiment, it was observed that the adhesive force between the bead spacer 24 and the alignment layer (the second alignment layer 23B) could be improved.

Example 3 of Embodiment

The second substrate 21B was prepared by the above-described second laminate producing step SP3. At that time, the diameter of the bead spacer 24 is indicated by R. Further, a maximum diameter of a portion held inside the projection 30 in the bead spacer 24 is indicated by r (see FIG. 1) and three samples of r/R=1.0, r/R=0.8, and r/R=0.6 were prepared by adjusting the viscosity or the like of the coating solution of the alignment layer 23B while changing a ratio r/R of r with respect to R.

Air was blow from an air gun (an air blow) to one sample of Comparative Example 2 and three samples of Example 3 (Examples 3-1 to 3-3) and the bead spacer remaining ratio was obtained. The nozzle of the air gun was 2 mmφ, the distance between the air gun and the second substrate was 5 mm, and the blowing time was 15 sec. The pressure of the air blow was 6 kgf/cm². The result is shown in Table 2 below.

TABLE 2

| Condition | Comparative Example 2 | Example 3-1 r/R = 1.0 | Example 3-2 r/R = 0.8 | Example 3-3 r/R = 0.6 |
| --- | --- | --- | --- | --- |
| Remaining ratio (%) | 20 | 100 | 85 | 55 |

As shown in Table 2, the bead spacer remaining ratio was 20% in Comparative Example 2. However, in Examples 3-1 to 3-3, the remaining ratio of the bead spacer 24 was higher than that of Comparative Example 2. As a result, the remaining ratio of the bead spacer 24 could be improved as compared with Comparative Example 2. In Example 3, the remaining ratio of the bead spacer 24 increased as r/R increased and was 100% at r/R=1. Here, it is preferable that the remaining ratio of the bead spacer 24 be 80% or more in order to prevent the observation of rainbow unevenness or the like in the light control film 1. In the above-described result, since the remaining ratio is 85% at r/R=0.8, 0.8≤r/R is preferable.

Comparative Example 3

Figure 3:
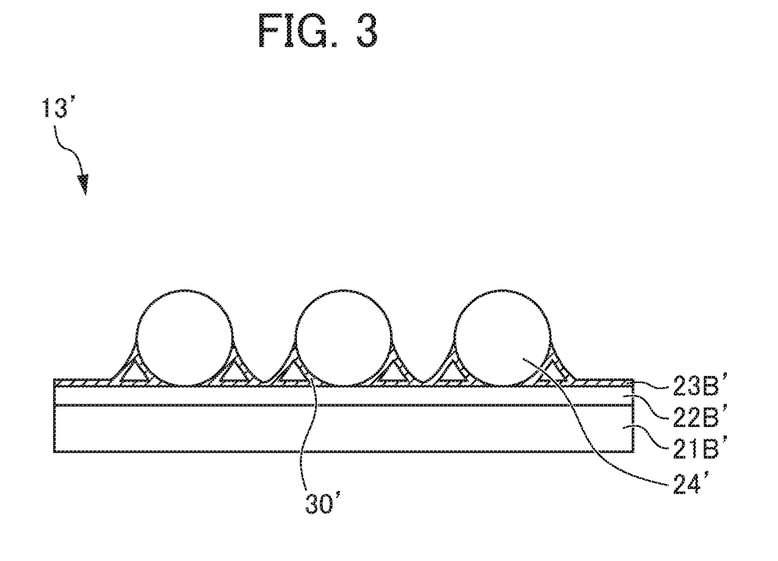
FIG. 3 illustrates a second laminate 13' of Comparative Example 3.

Next, Comparative Example 3 will be described. FIG. 3 is a diagram illustrating a second laminate 13' of Comparative Example 3. In the second alignment layer producing step SP3-2, a coating agent of a second alignment layer 23B' applied onto a second substrate 21B' while being mixed with a bead spacer 24' is dried. Here, in Comparative Example 3, a solvent having low viscosity and a low boiling point is used. Then, a drying wind is set to be strong. Accordingly, a sample having the same appearance as that of the embodiment of FIG. 1 and including the second alignment layer 23B' with a hollow projection 30' was prepared. Then, air was blown from an air gun (an air blow) to the sample of Comparative Example 3 and the bead spacer remaining ratio was obtained. The nozzle of the air gun is 2 mmφ, the distance between the air gun and the second substrate is 5 mm, and the blowing time is 15 sec. The pressure of the air blow is 6 kgf/cm². The result is shown in Table 3 below. Table also shows numerical values of Comparative Example 2 and Example 3 for comparison.

TABLE 3

| Condition | Comparative Example 2 | Comparative Example 3 r/R = 1 (Hollow) | Example 3 r/R = 1 (Solid) |
| --- | --- | --- | --- |
| Remaining ratio (%) | 20 | 35 | 100 |

As shown in Table 3, in the case of Comparative Example 3 in which the projection 30' is hollow, the remaining ratio of the bead spacer 24' is 35%. That is, when the projection 30' is hollow, the adhesive degree between the alignment layer 23B' and the bead spacer 24' is lower by 35% than that the embodiment in which the projection 30 is solid and hence this result is not preferable. That is, it is preferable to fill the inside of the projection 30 of the alignment layer 23B with the material of the alignment layer 23B.

Second Embodiment

Figure 4:
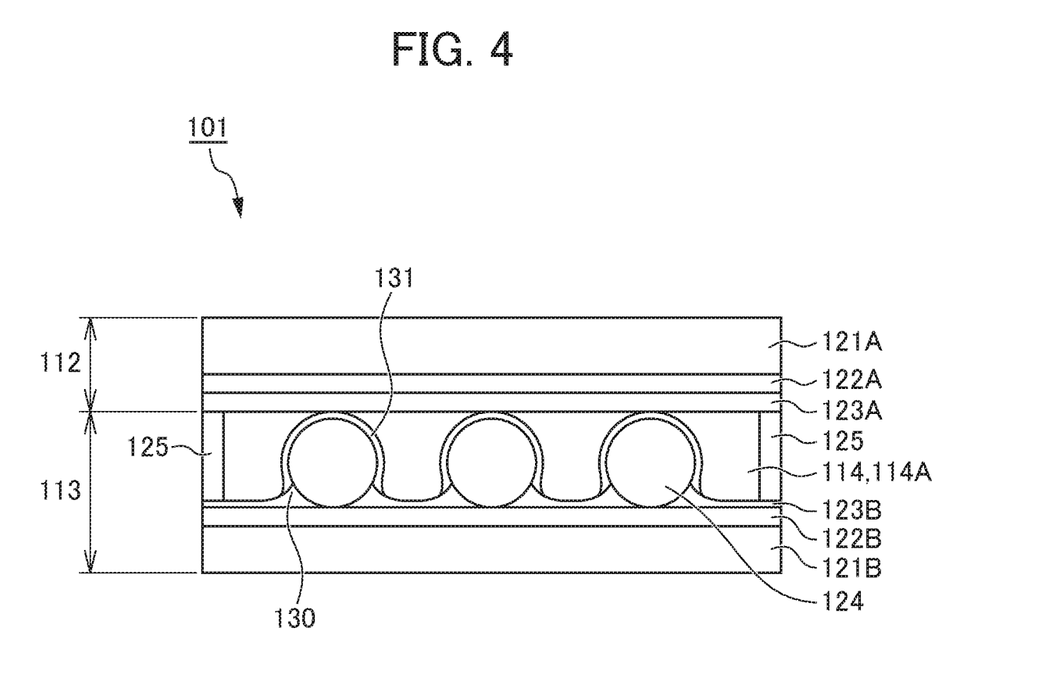
FIG. 4 is a cross-sectional view illustrating a light control film 1 of a second embodiment.

FIG. 4 is a cross-sectional view illustrating a light control film 1 of a second embodiment. Furthermore, in the description and drawings below, parts having the same functions as those of the first embodiment described above are denoted by the same reference numerals at the end (last two digits) and a redundant description will be appropriately omitted. The light control film 101 of the embodiment is mainly different from the light control film 1 of the first embodiment in that a bead spacer 124 is covered with a material forming the alignment layer as illustrated in FIG. 4. The bead spacer 124 of the light control film 101 of the embodiment is held by a covering portion 131 and a projection 130 formed of the same alignment layer material as that of the second alignment layer 123B.

The projection 130 is formed to surround the lower outer peripheral curved surface of the bead spacer 124 similarly to the projection 30 of the first embodiment. The covering portion 131 is formed so as to cover the entirety of the outer peripheral curved surface (the surface) of the bead spacer 124 held by the projection 130, that is, the outer peripheral curved surface of the bead spacer 124 except for a portion held by the projection 130.

In the embodiment, the production of the second alignment layer 123B and the arrangement of the bead spacer 124 (the formation of the projection 130 and the covering portion 131) are performed, for example, as below. Similarly to the first embodiment, in a second alignment layer producing step (SP3-2), a coating solution (an alignment layer material) which is used for the second alignment layer 123B and in which the bead spacers 124 are dispersed is applied by a gravure coater. Then, the solvent of the coating solution is volatilized and dried in a drying oven, so that the second alignment layer 123B is formed and the bead spacer 124 is held by the projection 130 and the covering portion 131.

Here, since the coating solution involving with the second alignment layer 123B according to the embodiment has, for example, viscosity higher than that of the coating solution used in the first embodiment, the coating solution (the alignment layer material) is also made to remain on the outer peripheral curved surface on the upper side (the first substrate 21A) of the bead spacer 124 even after the drying. Accordingly, the second alignment layer 123B is formed on the second transparent electrode 122B and the projection 130 and the covering portion 131 are formed to hold the bead spacer 124. Furthermore, the method of forming the covering portion 131 is not limited to the above-described example and the covering portion 131 may be formed by changing the drying condition (the drying time or the drying temperature) as compared with the first embodiment.

Since the projection 130 and the covering portion 131 of the embodiment are formed of the same coating solution (alignment layer material) in the same step as described above, they are integrally formed with the second alignment layer 123B. However, the invention is not limited thereto and the projection 130 and the covering portion 131 may be formed separately. For example, as in the first embodiment, the projection 130 which holds the lower outer peripheral curved surface of the bead spacer 124 may be formed along with the second alignment layer 123B and the covering portion 131 may be formed by a separate step.

As described above, in the light control film 101 of the embodiment, the second alignment layer 123B of the second laminate 113 is provided with the plurality of projections 130 protruding toward the liquid crystal layer 114 and at least a part of the bead spacer 124 is held by the projection 130. Accordingly, similarly to the light control film 1 of the first embodiment, since the light control film 101 can more strongly dispose the bead spacer 124 in the second alignment layer 123B as compared with a case where the bead spacer having the adhesion layer is sprayed to be disposed on the alignment layer, it is possible to extremely suppress the movement of the bead spacer in the liquid crystal inflow step or the like. Further, in the light control film 101 of the embodiment, since the bead spacer 124 is held by the projection 130 provided in the second alignment layer 123B similarly to the light control film 1 of the first embodiment, a gap between the second alignment layer 123B and the bead spacer 124 is filled with the alignment layer material (the coating solution). Accordingly, since it is possible to extremely reduce the amount of air remaining in the liquid crystal layer due to the gap, it is possible to largely suppress bubbles from being generated in the liquid crystal layer due to the heating of the laminating step (SP6) or a change in temperature or the like at the time of using the light control film later. Furthermore, since the light control film 101 of the embodiment includes the covering portion 131 which covers the outer peripheral curved surface (the surface) of the bead spacer 124 held by the projection 130, it is possible to strongly adhere the bead spacer 124 to the second alignment layer 123B as compared with the case of the first embodiment.

Modified Example (1) There is a tendency that the dispersion degree of the bead spacer 24 in the alignment layer becomes poor as the number of the bead spacers 24 per 1 $mm^2$ increases. This is because the bead spacers 24 are clustered due to the agglomeration. In order to prevent this problem, the bead spacers 24 may be separately adhered to the first substrate 21A and the second substrate 21B. In this case, even when the density of the bead spacer 24 of one substrate of the first substrate 21A and the second substrate 21B is low and the gap unevenness of the liquid crystal layer occurs in a normal state due to a certain reason, it is possible to suppress the occurrence of the gap unevenness of the liquid crystal layer by the interpolation of the bead spacer 24 of the other substrate. Further, the bead spacer may be dispersed in the coating solution of the first alignment layer so that the bead spacer is held by the projection formed on the first alignment layer.

(2) Further, the formation of the alignment layer including the bead spacer 24 on one of the first substrate 21A and the second substrate 21B may be performed two times. Also in this case, even when the density of the bead spacer 24 fixed at the first time is low and the gap unevenness of the liquid crystal layer occurs in a normal state due to a certain reason as in (1), the second fixing of the bead spacer 24 can suppress the occurrence of gap unevenness in the liquid crystal layer. The agglomeration of the bead spacer 24 can be satisfactorily prevented.

(3) In the above-described embodiment, the flexible light control film has been described as a kind of light control member, but the invention is not limited thereto. For example, a plate-shaped member which uses a glass plate as a substrate and does not have flexibility may be used as the light control member. In this case, the light control member may be directly disposed on a part to which external light is incident in a building or a vehicle instead of a reinforced glass in which the light control member adheres to one surface of the transparent member or is sandwiched between two transparent members.

(Effect)

As described above, according to the embodiment, since the bead spacer 24 is mixed with the coating solution of the alignment layer in the light control film 1, it is possible to largely improve the adhesion of the bead spacer with respect to the alignment layer as compared with a case where the bead spacer is simply sprayed onto the alignment layer or a case where the bead spacer is caused to adhere by adhesive.

EXPLANATION OF REFERENCE NUMERALS

1 LIGHT CONTROL FILM
12 FIRST LAMINATE
13 SECOND LAMINATE
14 LIQUID CRYSTAL LAYER
14A LIQUID CRYSTAL
21A FIRST SUBSTRATE
21B SECOND SUBSTRATE
22A FIRST TRANSPARENT ELECTRODE
22B SECOND TRANSPARENT ELECTRODE
23A FIRST ALIGNMENT LAYER
23B SECOND ALIGNMENT LAYER
24 SPACER
24 BEAD SPACER
25 SEALING MATERIAL
30 PROJECTION

The invention claimed is:

1. A light control member comprising:
    a first laminate which includes a substrate and an alignment layer;
    a second laminate which includes a substrate and an alignment layer and is disposed with respect to the first laminate so that their alignment layers face each other;
    a liquid crystal layer which is disposed between the first laminate and the second laminate and of which alignment is controlled by the driving of an electrode provided in at least one of the first laminate and the second laminate; and
    a plurality of bead spacers which are disposed in the liquid crystal layer, the plurality of bead spacers overlap a region that is configured to transmit external light along a thickness direction of the light control member, wherein:

at least one alignment layer of the alignment layer of the first laminate and the alignment layer of the second laminate is provided with a plurality of projections which protrude toward the liquid crystal layer, at least a part of the bead spacers is held by the projection, and a ratio of a number of agglomerates of two to four bead spacers to a total sum of agglomerated bead spacers and non-agglomerated bead spacers among the plurality of bead spacers disposed in the liquid crystal layer is 20% or more and 55% or less.

2. The light control member according to claim 1, wherein the alignment layer includes a covering portion which covers a surface of a bead spacer held by the projection.

3. The light control member according to claim 1, wherein the substrates of the first laminate and the second laminate are resin films, and wherein the liquid crystal layer includes a dichroic dye.

4. The light control member according to claim 1, wherein a hard coat layer is provided on the liquid crystal layer side surface of at least one substrate of the substrates provided with the first laminate and the second laminate.

5. The light control member according to claim 1, wherein the bead spacer has a spherical shape, and wherein a relation of $0.8 \leq r/R$ is established when a diameter of the bead spacer is indicated by R and a maximum diameter of a portion held inside the projection in the bead spacer is indicated by r.

6. The light control member according to claim 1, wherein the inside of the projection is filled with a material of the alignment layer.

7. A light control body comprising:

a transparent member; and the light control member according to claim 1 disposed on the transparent member.

8. A vehicle in which the light control member according to claim 1 is disposed on a portion to which external light is incident.

9. The light control member according to claim 1, wherein an upper limit of a ratio of a number of agglomerates of five or more bead spacers to the total sum of agglomerated bead spacers and non-agglomerated bead spacers among the plurality of bead spacers disposed in the liquid crystal layer is smaller than 15%.

10. The light control member according to claim 1, wherein in the region that is configured to transmit external light along the thickness direction of the light control member, the ratio of the number of agglomerates of two to four bead spacers to the total sum of agglomerated bead spacers and non-agglomerated bead spacers among the plurality of bead spacers disposed in the liquid crystal layer is 20% or more and 55% or less.

11. A method for producing a light control member comprising:

a first laminate producing step of forming an alignment layer on a first substrate to form a first laminate;

a second laminate producing step of forming an alignment layer on a second substrate to form a second laminate;

a seal portion forming step of forming a seal portion on an outer peripheral portion of the second laminate;

a liquid crystal inflow step of flowing liquid crystal into the seal portion; and a laminating step of laminating the first laminate and the second laminate, wherein:

a plurality of bead spacers are included in at least one of a material forming the alignment layer of the first substrate and a material forming the alignment layer of the second substrate, in the light control member, the plurality of bead spacers overlap a region that is configured to transmit external light along a thickness direction of the light control member, and a ratio of a number of agglomerates of two to four bead spacers to a total sum of agglomerated bead spacers and non-agglomerated bead spacers among the plurality of bead spacers disposed in the liquid crystal layer is 20% or more and 55% or less.

12. The method for producing the light control member according to claim 11, wherein a bead spacer is included in both of materials forming the alignment layer of the first substrate and the alignment layer of the second substrate.

13. The method for producing the light control member according to claim 11, wherein in at least one of the first laminate producing step and the second laminate producing step, the formation of the alignment layer including the bead spacer is performed two times.

14. The method for producing the light control member according to claim 11, wherein an upper limit of a ratio of a number of agglomerates of five or more bead spacers to the total sum of agglomerated bead spacers and non-agglomerated bead spacers among the plurality of bead spacers disposed in the liquid crystal layer is smaller than 15%.

* * * * *